Figure 1:
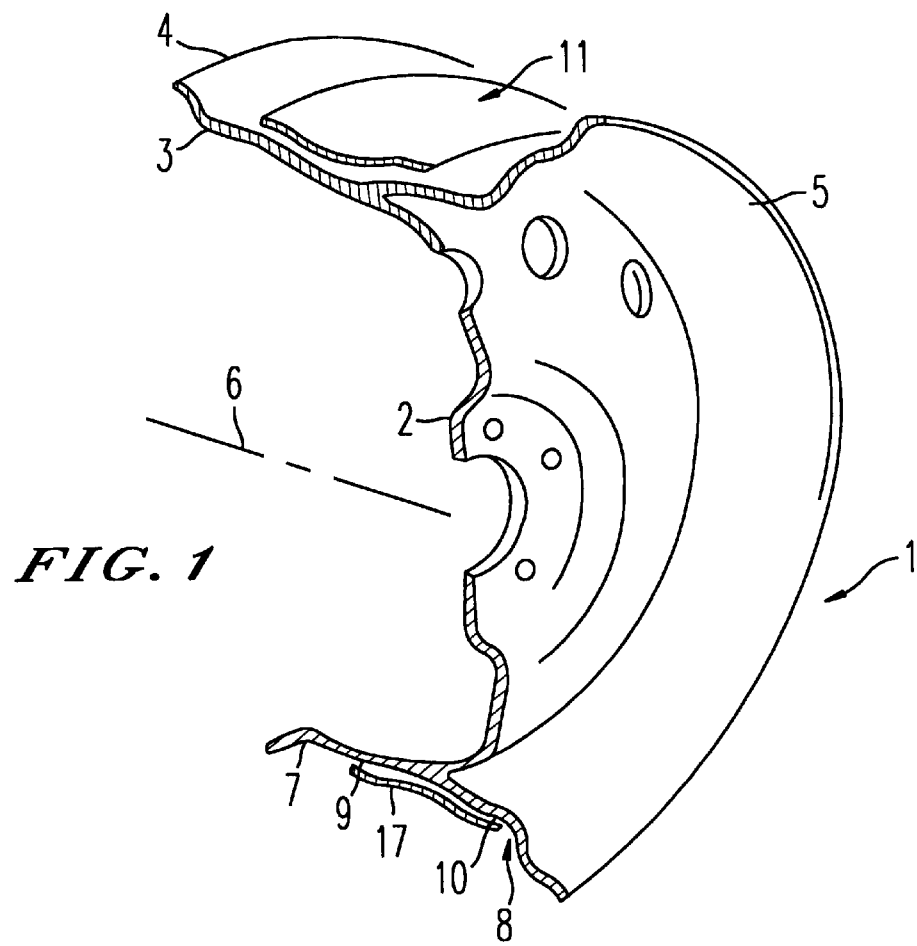

United States Patent [19]
Marron et al.

[11] Patent Number: 5,899,253
[45] Date of Patent: May 4, 1999

[54] DEVICE FOR SOUND INSULATING A WHEEL, IN PARTICULAR A WHEEL OF A MOTOR VEHICLE

[75] Inventors: Guy Marron, Gardanne; Didier Engel, Martigues, both of France

[73] Assignee: Sollac, Puteaux, France

[21] Appl. No.: 08/667,629

[22] Filed: Jun. 21, 1996

[30] Foreign Application Priority Data

Jun. 23, 1995 [FR] France .................................. 95 07547

[51] Int. Cl.⁶ .................................................. B60B 25/00
[52] U.S. Cl. ...................................... 152/381.5; 301/6.91
[58] Field of Search ................................. 301/6.91, 6.1, 301/95–98; 188/250 E, 264 G; 74/473, 574; 152/381.3, 381.5, 381.6, 153; 181/207, 284, 295

[56] References Cited

U.S. PATENT DOCUMENTS

| 1,563,811 | 12/1925 | Wagonhorst | ...................... 152/381.5 X |
| 1,693,909 | 12/1928 | Michelin | .............................. 152/381.5 |
| 4,122,882 | 10/1978 | Fisher et al. | . |
| 4,374,535 | 2/1983 | Watts | ................................... 152/381.6 |
| 4,635,501 | 1/1987 | Mizuno et al. | ............................ 74/574 |
| 4,896,921 | 1/1990 | Sato et al. | ........................ 152/381.5 X |
| 5,092,192 | 3/1992 | Pelzer | ................................... 301/6.91 X |
| 5,311,916 | 5/1994 | Fuller | . |

FOREIGN PATENT DOCUMENTS

| 0014097 | 8/1980 | European Pat. Off. | ............ 152/381.5 |
| 2601724 | 7/1976 | Germany | .............................. 152/381.6 |
| 4317268 | 12/1994 | Germany | .............................. 152/381.5 |
| 4159101 | 6/1992 | Japan | . |
| 6106902 | 4/1994 | Japan | . |
| 6106903 | 4/1994 | Japan | . |
| 2 158 785 | 11/1985 | United Kingdom | . |

*Primary Examiner*—Russell D. Stormer
*Attorney, Agent, or Firm*—Oblon, Spivak, McClelland, Maier & Neustadt, P.C.

[57] ABSTRACT

Device for sound insulating a wheel, in particular a wheel of a motor vehicle. The wheel comprises a circular central body, a substantially cylindrical rim including a rear part and a front part, the parts being separated by the plane of the body which extends substantially perpendicularly to the axis of rotation of the rim. The device includes at least one substantially cylindrical ring disposed concentrically relative to the rim and including at least one layer of a viscoelastic material, and at least one way to mechanically couple the cylindrical ring to the rim, the mechanical coupling ensuring a binding of the ring on the cylindrical parts of the rim.

10 Claims, 3 Drawing Sheets

DEVICE FOR SOUND INSULATING A WHEEL, IN PARTICULAR A WHEEL OF A MOTOR VEHICLE

The present invention relates to a device for sound insulating a wheel and in particular a wheel of a motor vehicle, said wheel comprising a circular central body, a substantially cylindrical rim comprising a rear part and a front part, said front and rear parts being separated by the plane of the body which extends substantially perpendicularly to the axis of the rim.

The need to improve the comfort of the users of motor vehicles obliges motor vehicle manufacturers to seek out on said vehicles the causes of vibrations and to attempt to reduce or if possible eliminate them.

In the field of motor vehicle wheels, the wheels, made for example by press forming, flow turning, or rolling, have the drawback of emitting and transmitting vibrations which have repercussions in the passenger compartment.

The vibrations of the wheels produce a noise which may be of the aerodynamic type at frequencies above 500 Hz, or of the solidien or structural type at frequencies below 500 Hz.

Many studies have concerned a quantification of various effects, in particular the influence of the tread design of the tires, the surface of the roads, the speed of the vehicle, and the steel of which the wheel is composed.

There is known from the patent FR No. 76 15 476, a device for reducing the noise made by a wheel when braking which comprises a resilient band of the spring blade type the bearing points of which are placed in the region of the vibration antinodes of the wheel.

An object of the invention is to improve the acoustic comfort of the users of motor vehicles in all the fields of operation of the vehicle.

The invention provides a device which is characterized in that it comprises, at least one substantially cylindrical ring disposed concentrically relative to the rim and including at least one layer of a viscoelastic material, and at least one mechanical coupling means for coupling said cylindrical ring to the rim, said coupling means ensuring the binding of said ring on the cylindrical parts of the rim.

According to other features of the invention:

the ring has an omega-shaped cross section and comprises two circular bearing edges ensuring the contact of said ring with the cylindrical parts of the rim, the ring is metallic and preferably of steel, the ring is of a sandwich-type material, the ring is formed by at least one band the ends of which are interconnected by said coupling means, said coupling means for the ring comprises at least one clip cooperative with hooking means provided on the ends of said at least one band forming said ring, the clip is C-shaped and permits, owing to its resilience, exerting a tension on the ring and maintaining the ring on the rim, the hooking means are formed by at least two hooks disposed on the ends of said at least one band forming said ring, the hooking means are formed by at least two openings provided on the ends of said at least one band forming said ring.

Figure 2:
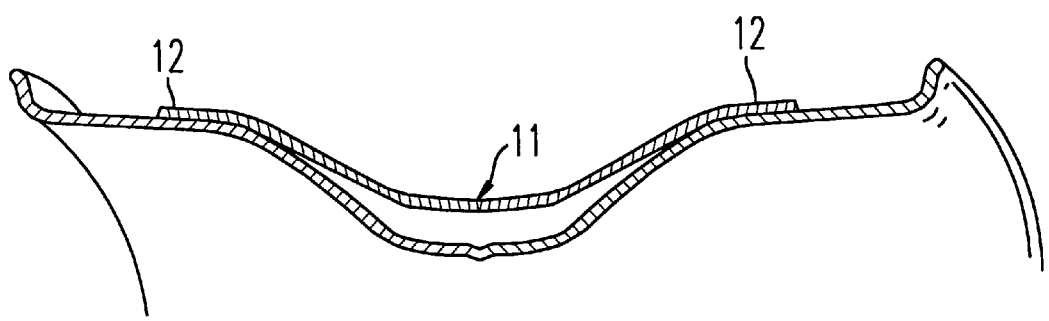
Figure 3:
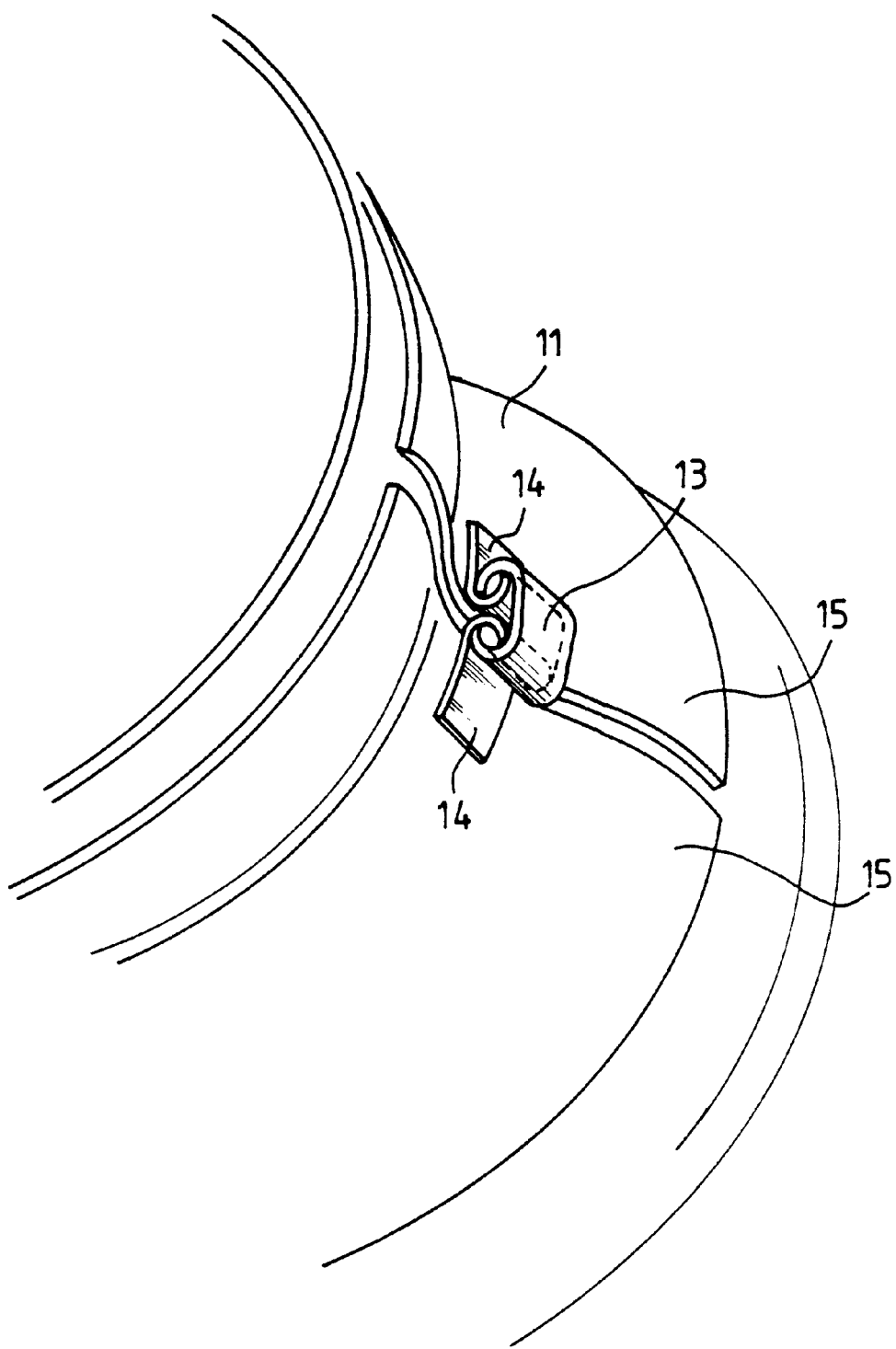
Figures 4A, 4B:
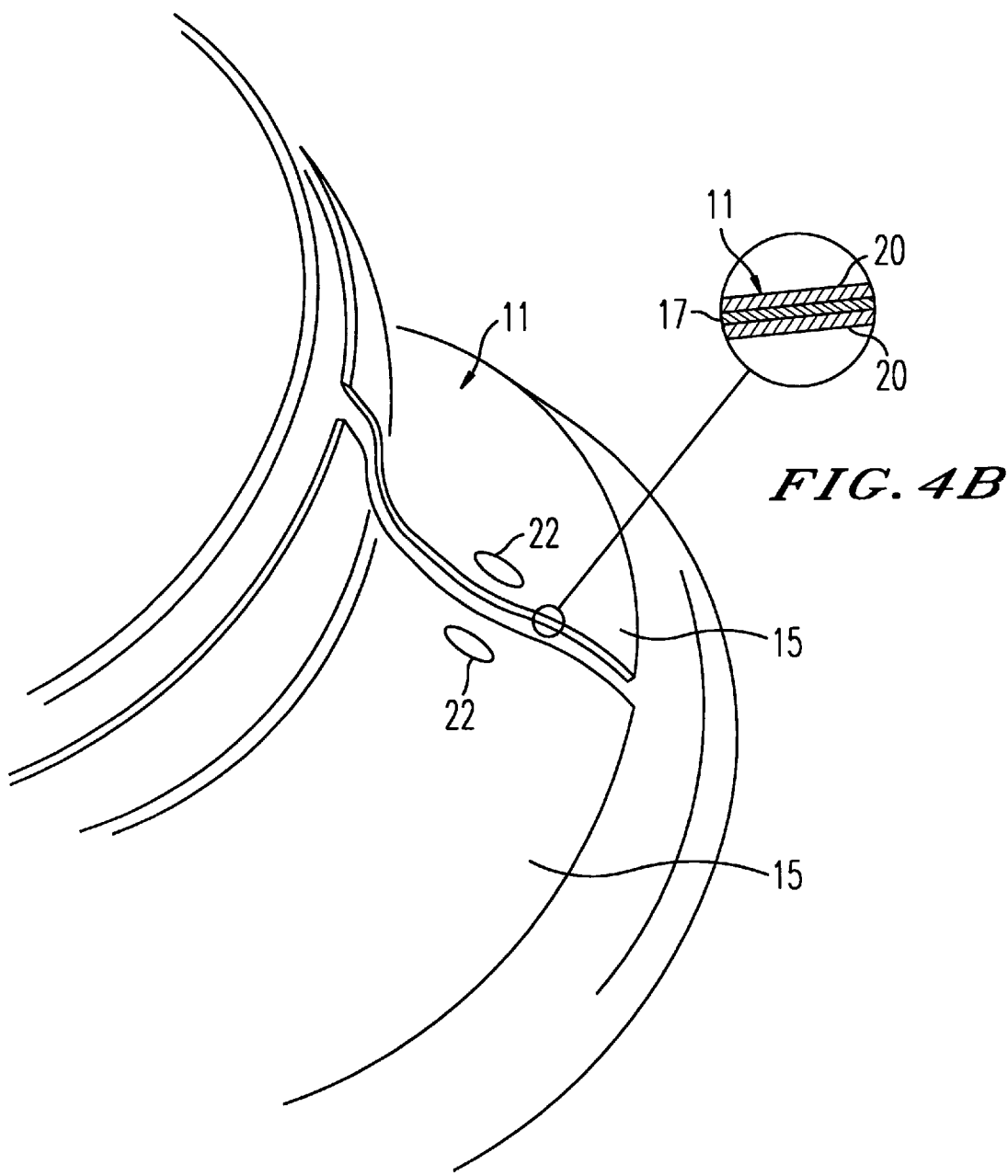

Further features and advantages of the invention will appear from the following description which is given solely by way of example with reference to the accompanying drawings, in which:

FIG. 1 is a partial perspective view of a wheel equipped with a sound insulating device according to the invention, FIG. 2 is a cross-sectional view of one embodiment of the ring of the device according to the invention, FIG. 3 is a partial perspective view of one embodiment of a coupling means for the ring of the device according to the invention, FIG. 4A is a partial perspective view of one embodiment of the hooking means according to the invention, and FIG. 4B is an expanded view of the ring according to one embodiment of the invention.

The device for sound insulating a wheel, for example of a motor vehicle, is mounted on a wheel 1 of the vehicle as shown in FIG. 1, the wheel comprising a circular central body 2, a substantially cylindrical rim 3 comprising a rear cylindrical part 4 and a front cylindrical part 5, the parts 4 and 5 being separated by the plane of the body 2 which extends perpendicularly to the axis 6 of the rim 3, this axis corresponding to the axis of rotation of the wheel.

In the embodiment shown in FIG. 1, the rim comprises a rear toric recess 7, a front toric recess 8 and two opposite shoulders 9 and 10 forming a hollow base in the region of the central body 2. The hollow base has a technical function. It serves to clear one of the lips of the tire of the wheel when the later is being mounted or dismounted.

According to the invention, the device for sound insulating the wheel 1 comprises at least one substantially cylindrical ring 11 disposed concentrically relative to the rim 3 and comprising at least one layer of a viscoelastic material (not shown), and at least one mechanical coupling means for coupling said cylindrical ring to the rim 3, said coupling means ensuring a binding of the ring on the cylindrical parts 4 and 5 of the rim 3.

The ring 11 is made from at least one band of rolled metallic sheet, preferably of steel.

In this embodiment, the ring 11 has, in cross section as shown in FIG. 2, an omega shape, the two wings 12 of the omega forming two circular bearing edge portions which ensure the contact of the ring 11 with the upper parts of the hollow base of the rim 3 formed by the shoulders 9 and 10. The contact of the ring 11 on the rim 3 may be extended on the parts of the shoulders forming the hollow base of said rim.

The omega-shaped section of the ring 11 permits retaining, for the wheel, the hollow base for the mounting and dismounting of tires and the device permits improving the rigidity so as to avoid its specific vibrations, and obtaining an increased surface area for the attenuation of the vibrations of the wheel. The omega shape of the ring 11 also affords a good contact of the ring 11 with the shoulders of the rim 3 and centers the ring in the hollow base of the rim.

According to the invention, a ring 11 having a section whose shape is other than that of an omega may be employed when the chosen shape ensures, on one hand, a clearance for the lips of the tire when it is being mounted or dismounted and, on the other hand, a bearing of the ring on the shoulders of the rim 3.

The ring 11 comprises at least one layer of a viscoelastic material which has the property of absorbing or damping the energy of the mechanical vibrations, this energy being converted into heat within the mass of the material.

The ring 11 may be made from a band of a sandwich-type sheet, as shown in FIG. 4B. The layer of viscoelastic material 7 is in this case inserted between two metallic skins 20, 20, for example of steel, to form the sandwich structure.

The ring 11 of the device comprises a mechanical coupling means for coupling it to the rim 3 of the wheel 1. These coupling means put the ring 11 under tension so that the binding achieved on the rim 3 permits the vibrations of the wheel to be transmitted to the viscoelastic material of the ring 11, thereby creating the energy absorbing or damping effect.

The ring 11 may comprise at least two semi-cylindrical bands, which facilitates the fitting of the ring on the wheel 1. Each of the at least two semi-cylindrical bands (not shown) extend approximately halfway around the rim 3.

In one embodiment, such as that shown in FIG. 3, the coupling means comprise a C-shaped fastener or clip 13 associated with hooking means formed by at least two hooks 14 provided on the ends 15 of the band constituting the ring 11. The C-shaped clip permits, owing to its resilience, exerting a tension on the ring for maintaining the ring on the rim 3.

In an alternative embodiment the hooking means of the C-shaped clip may be formed by at least two openings 22, 22 provided close to the ends 15 of the band constituting the ring 11, as shown in FIG. 4A.

Any other hooking means may be envisaged.

Measurements have been taken to ascertain the damping effect on the vibratory energy communicated to a motor vehicle wheel.

These measurements have been carried out with a device comprising a ring 11 having an omega-shaped section and a mechanical coupling means under tension, as shown in FIG. 3.

A motor vehicle wheel 1 is subjected to vibrations in such manner as to create the vibration modes of the wheel, on one hand without the device of the invention and, on the other hand, with the device of the invention.

The device associated with the wheel comprises a ring formed from a sandwich sheet of the "SOL CONFORT" type 0.75 mm thick. The ring has an omega-shaped section the two wings of which bear on the upper part of the hollow base of the rim. The ring is fixed under tension by means of clips of spring steel forming clasps clamping together two hooks provided on the ends of the band or bands constituting the ring.

It has been found that the rim is the most influential element of the wheel, and more particularly the rear and front parts of the rim.

The device according to the invention permits reducing in particular the low frequency vibrations.

What is claimed is:

1. Device for sound insulating a wheel, and in particular a wheel of a motor vehicle, said wheel having a circular central body in a plane, a substantially cylindrical rim having an axis of rotation and including a rear cylindrical portion and a front cylindrical portion, said portions being separated by said plane of said body which extends substantially perpendicularly to said axis of said rim, said device comprising: at least one substantially cylindrical ring disposed concentrically relative to said rim and including at least one layer of viscoelastic material, and at least one mechanical coupling means for coupling said at least one ring to said rim, said at least one coupling means ensuring contact of said at least one ring on said cylindrical portions of said rim.

2. Device for sound insulating a wheel of a motor vehicle, said wheel having a circular central body in a plane, a substantially cylindrical rim having an axis of rotation and including a rear cylindrical portion and a front cylindrical portion, said portions being separated by said plane of said body which extends substantially perpendicularly to said axis of said rim, said device comprising:

at least one substantially cylindrical ring disposed concentrically relative to said rim and including at least one layer of a viscoelastic material, said at least one ring having a substantially omega-shaped cross section which includes two circular bearing edge portions ensuring contact of said at least one ring with said cylindrical portions of said rim; and at least one mechanical coupling means for coupling said at least one ring to said rim, said at least one coupling means ensuring contact of said at least one ring on said cylindrical portions of said rim.

3. Device according to claim 1, wherein said at least one ring is metallic.

4. Device according to claim 1, wherein said at least one ring is of steel.

5. Device according to claim 1, wherein said at least one ring includes one of said at least one layer of viscoelastic material inserted between two metallic skins.

6. Device according to claim 1, wherein said at least one ring is formed by at least one band having ends which are interconnected by said at least one coupling means.

7. Device according to claim 6, wherein said at least one coupling means comprises hooking means provided adjacent said ends of said at least one band, and at least one clip cooperative with said hooking means.

8. Device according to claim 7, wherein said at least one clip is a resilient C-shaped clip which exerts a tension on said at least one ring and maintains said at least one ring on said rim.

9. Device according to claim 7, wherein said hooking means are formed by at least two hooks disposed adjacent said ends of said at least one band.

10. Device according to claim 7, wherein said hooking means are formed by at least two openings provided adjacent said ends of said at least one band.

* * * * *